M. SHELDEN.
Revolving Harrow.

No. 35,784.

Patented July 1, 1862.

Witnesses:
Charles R. White
Thomas McKnight

Inventor:
Moses Shelden

UNITED STATES PATENT OFFICE.

MOSES SHELDEN, JR., OF CALAIS, VERMONT.

IMPROVEMENT IN HARROWS.

Specification forming part of Letters Patent No. 35,784, dated July 1, 1862.

*To all whom it may concern:*

Be it known that I, MOSES SHELDEN, Jr., of Calais, in the county of Washington and State of Vermont, have invented a new and useful Improvement in Harrows; and I do hereby declare that the following is a full, clear, and exact description, reference being had to the accompanying drawings, forming a part of this specification.

Figure 1:
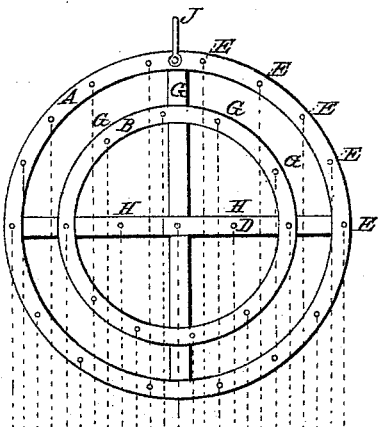
Figure 2:
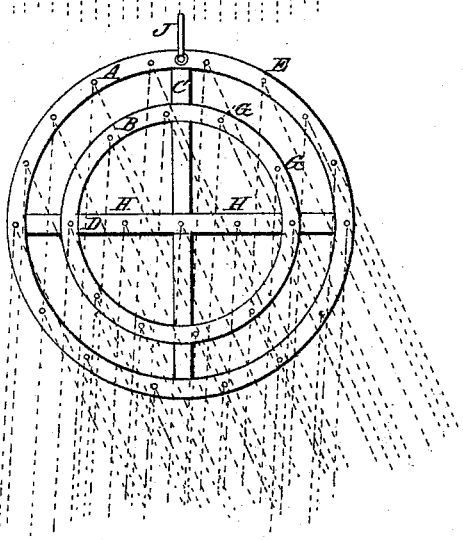
Figure 3:
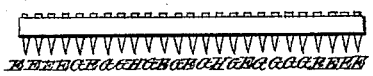

Figures 1 and 2 are top views. Fig. 3 is a front elevation.

Similar letters of reference indicate like parts in all the drawings.

The dotted black lines in Fig. 1 show the paths of the several teeth when the harrow moves forward in its proper position, the paths being all at a uniform distance apart. The colored lines in Fig. 2 show the paths of the several teeth when the harrow swings around so as to move obliquely, the paths being more evenly distributed or at a more nearly uniform distance apart under such conditions than in any arrangement of the teeth previously known to me.

The nature of my invention consists in the arrangement of the teeth in concentric circles, whereby they cut the earth evenly when the harrow is moved directly in the line of draft, and when the harrow swings around and moves obliquely sidewise they still cut the earth nearly equally in consequence of this peculiar arrangement.

To enable others skilled in the art to make and use my invention, I will proceed to describe its construction and operation by the aid of the drawings.

A and B are two stout rings, and C and D are two cross-pieces of timber, iron, or other suitable material. A, B, C, and D are rigidly secured together and constitute the frame of my harrow. A series or circular row of teeth, E, is fixed in the outer ring, C, and another series of fewer teeth, G, is fixed in B, the latter being thus concentrically within the first series, E, and disposed as represented. H H are similar teeth fixed in the cross-bar D within the inner circular series, G.

J is the draft-clevis.

Fig. 3 shows the teeth as seen when looking at the harrow from the front or rear, and is introduced to show the uniformity with which the lines of action of the teeth are distributed. The dotted lines in Fig. 1 are also designed to exhibit the same feature.

The distance of the teeth each from the other avoids the liability to clog, while the proximity of their several paths renders the harrow very efficient.

The red dotted lines in Fig. 3 show the effect when the harrow moves obliquely sidewise, as in working side hills. This condition is very common or almost universal in some districts, and harrows having the teeth arranged in straight lines require the teeth to be placed so near together as to be liable to clog, or otherwise the teeth are certain to fall into, or nearly into, line with each other and work the earth very badly. In my harrow the action on the soil when the earth is at a considerable inclination laterally to the path of the team is still nearly as uniform as before, although the harrow is moved quite obliquely. This is due to the curvature and the concentric arrangement of the series of teeth.

A single circular series of teeth is not the equivalent of my invention, because in such arrangement the edges of the path of the harrow are by a well-known property of the circle more finely cut than the central portions of such path, while in my invention the presence of the inner series, G, compensates for this objectionable property of the circular arrangement.

The advantages due to the arrangement of teeth in my harrow are, first, the earth is finely and evenly pulverized with the teeth so widely separated on the harrow as to avoid clogging; and, second, the teeth are presented in the same, or nearly the same, relations to each other when the harrow swings obliquely sidewise, and the action is nearly uniform under all kinds of motion, while harrows in which the teeth are differently arranged cannot effect this.

Having now fully described my invention, what I claim as new therein, and desire to secure by Letters Patent, is—

The arrangement of the teeth of a harrow in concentric series in the manner shown by E and G, with or without the straight series H, extending across the center, for the purposes herein set forth.

MOSES SHELDEN, JR.

Witnesses:
LEMUEL S. BENNETT,
C. C. EATON.